US012515128B1

(12) United States Patent
Hu et al.

(10) Patent No.: US 12,515,128 B1
(45) Date of Patent: Jan. 6, 2026

(54) GAME SCENE MANAGEMENT METHOD AND SYSTEM, APPARATUS, AND MEDIUM

(71) Applicant: HANGZHOU ELECTRONIC SOUL NETWORK TECHNOLOGY CO., LTD, Zhejiang (CN)

(72) Inventors: Jianping Hu, Hangzhou (CN); Lijun Qian, Hangzhou (CN)

(73) Assignee: HANGZHOU ELECTRONIC SOUL NETWORK TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 19/215,307

(22) Filed: May 21, 2025

(30) Foreign Application Priority Data

Oct. 28, 2024 (CN) ........................ 202411505632.3

(51) Int. Cl.
*A63F 13/52* (2014.01)
*G06F 9/30* (2018.01)
(Continued)

(52) U.S. Cl.
CPC ............ *A63F 13/52* (2014.09); *H04L 67/131* (2022.05); *A63F 2300/5566* (2013.01); *G06F 9/30021* (2013.01); *G06F 17/00* (2013.01)

(58) Field of Classification Search
CPC ...... A63F 13/52; A63F 13/798; A63F 13/352; A63F 2300/556; G06F 17/00; G06F 9/5083; G06F 9/30021; H04L 67/131
(Continued)

(56) References Cited

U.S. PATENT DOCUMENTS 6,015,348 A * 1/2000 Lambright .............. A63F 13/12 463/29
2006/0258463 A1* 11/2006 Cugno .................. A63F 13/795 463/42

(Continued)

FOREIGN PATENT DOCUMENTS

CN 101180677 A 5/2008
CN 103873457 A * 6/2014

(Continued)

OTHER PUBLICATIONS

First Office Action of counterpart Chinese Patent Application No. 202411505632.2 issued on Dec. 10, 2024.

(Continued)

*Primary Examiner* — Xuan M Thai
*Assistant Examiner* — Zachary Joseph Pollock

(57) ABSTRACT

Provided are a game scene management method and system, an apparatus, and a medium, the method comprises: creating a game scene of a preset game to allow a logged-in player character to enter therein; detecting number of player characters in each game scene to obtain a game scene to be merged in which number of player characters is less than a threshold number for scene merging, in the case where the preset game has at least two game scenes; merging the game scenes based on the game scene to be merged, directly obtaining a merged game scene if number of player characters in the merged game scene is less than a threshold number for scene splitting, and splitting and merging the game scenes based on the game scene to be merged if number of player characters in the merged game scene is greater than the threshold number for scene splitting.

8 Claims, 1 Drawing Sheet

(51) Int. Cl.
*G06F 17/00* (2019.01)
*H04L 67/131* (2022.01)

(58) Field of Classification Search
USPC ........................ 463/31, 42, 29; 709/20, 20 X
See application file for complete search history.

(56) References Cited

U.S. PATENT DOCUMENTS

| | | | | |
|---|---|---|---|---|
| 2009/0325712 | A1* | 12/2009 | Rance | A63F 13/30 463/42 |
| 2023/0050195 | A1* | 2/2023 | Pierse | A63F 13/798 |

FOREIGN PATENT DOCUMENTS

| | | | |
|---|---|---|---|
| CN | 106302340 | A | 1/2017 |
| CN | 109741499 | A | 5/2019 |
| CN | 116383171 | A | 7/2023 |
| EP | 4244711 | A1 | 9/2023 |
| GB | 2499694 | A | 8/2013 |
| JP | 2003210847 | A | 7/2003 |
| JP | 2018042746 | A | 3/2018 |
| WO | 2022062643 | A1 | 3/2022 |

OTHER PUBLICATIONS

Notice of Allowance of counterpart Chinese Patent Application No. 202411505632.2 issued on Feb. 7, 2025.

* cited by examiner

GAME SCENE MANAGEMENT METHOD AND SYSTEM, APPARATUS, AND MEDIUM

CROSS-REFERENCE TO RELATED APPLICATIONS

The present disclosure claims the priority to the Chinese patent application with the filing number 2024115056323 filed on Oct. 28, 2024 with the China National Intellectual Property Administration and entitled "Game Scene Management Method and System, Apparatus, and Medium", the contents of which are incorporated herein by reference in entirety.

TECHNICAL FIELD

The present disclosure relates to the field of game development technologies, and in particular to a game scene management method and system, an apparatus, and a medium.

BACKGROUND ART

A game scene server, which is deployed on the server side, has always been an indispensable part for a massive multiplayer online game. The scene server is responsible for storing and processing scene information in the game, such as maps, NPCs, monsters, players, etc., and operations such as movements and interactions performed by the players in the game are processed by the scene server.

In the prior solution, the scene server generally adopts a balanced distribution strategy in matching of players and game scenes. In short, players are allowed to preferentially enter game scenes with fewer players, by setting priority of entry into the game scenes. It can be seen that this balanced distribution strategy will cause a relatively small number of players to be managed in each game scene in the case where there are not many players.

Currently, no effective solution has been proposed to solve the unreasonable problems existing in the prior game scene management strategy in the related art.

SUMMARY

Embodiments of the present disclosure provide a game scene management method and system, an apparatus, and a medium to solve at least the unreasonable problems existing in the prior game scene management strategy in the related art.

In a first aspect, an embodiment of the present disclosure provides a game scene management method, the method including steps of:

- creating a game scene of a preset game by a game scene server to allow a logged-in player character to enter therein;
- detecting the number of player characters in each game scene by the game scene server to obtain a game scene to be merged in which the number of player characters is less than a threshold number for scene merging, in the case where the preset game has at least two game scenes; and
- performing merging of the game scenes based on the game scene to be merged, directly obtaining a merged game scene if the number of player characters in the merged game scene is less than a threshold number for scene splitting, and performing splitting and merging of the game scenes based on the game scene to be merged if the number of player characters in the merged game scene is greater than the threshold number for scene splitting.

In some embodiments, the step of creating a game scene of a preset game by a game scene server to allow a logged-in player character to enter therein includes:

- creating the game scene by the game scene server as a target game scene of the preset game; and
- allowing a player character logged into the preset game to enter the target game scene, and continuing to create a game scene by the game scene server as the target game scene if the number of player characters in the currently existing target game scene reaches a maximum threshold number for the scene.

In some embodiments, after the step of creating a game scene of a preset game by a game scene server to allow a logged-in player character to enter therein, the method includes:

- evenly allocating, by the game scene server, player characters that are subsequently logged into the preset game so that they enter a game scene with fewer player characters, if the number of player characters in the existing game scene does not reach a maximum threshold number for the scene due to the exit of player characters, in the case where the preset game has at least two game scenes.

In some embodiments, the step of performing splitting and merging of the game scenes based on the game scene to be merged includes:

- splitting player characters in another game scene and merging them into the game scene to be merged, so as to maintain a balance in the number of player characters between another game scene and the game scene to be merged, wherein another game scene is a game scene in which the number of player characters is greater than the threshold number for scene merging.

In some embodiments, the step of performing merging of the game scenes based on the game scene to be merged includes:

- merging any of the game scenes to be merged with another game scene, and merging the different game scenes to be merged, wherein another game scene is a game scene in which the number of player characters is greater than the threshold number for scene merging.

In some embodiments, further including a step of:

- detecting the number of player characters in each game scene by the game scene server, and splitting a game scene if it is detected that the number of player characters therein is greater than the threshold number for scene splitting.

In some embodiments, the preset game is a massive multiplayer online game.

In a second aspect, an embodiment of the present disclosure provides a game scene management system, wherein the system is configured to execute the method described in the above first aspect, and the system includes a game scene creation module, a game scene detection module, and a scene merging and splitting module, wherein

- the game scene creation module is configured to create a game scene of a preset game by a game scene server to allow a logged-in player character to enter therein;
- the game scene detection module is configured to detect the number of player characters in each game scene by the game scene server to obtain a game scene to be merged in which the number of player characters is less than a threshold number for scene merging, in the case where the preset game has at least two game scenes; and the scene merging and splitting module is configured to perform merging of the game scenes based on the game scene to be merged to obtain a merged game scene, and perform splitting and merging of the game scenes based on the game scene to be merged if the game scene server detects that the number of player characters in the merged game scene is greater than the threshold number for scene splitting.

In a third aspect, an embodiment of the present disclosure provides an electronic apparatus, including a memory, a processor, and a computer program stored on the memory and capable of running on the processor, wherein the processor, when executes the computer program, implements the method as described in the above first aspect.

In a fourth aspect, an embodiment of the present disclosure provides a computer-readable storage medium, storing a computer program thereon, wherein the computer program, when executed by a processor, implements the method as described in the above first aspect.

As compared with the related art, embodiments of the present disclosure provide a game scene management method, a game scene management system, an apparatus, and a medium, wherein the method includes: creating a game scene of a preset game by a game scene server to allow a logged-in player character to enter therein; detecting the number of player characters in each game scene by the game scene server to obtain a game scene to be merged in which the number of player characters is less than a threshold number for scene merging, in the case where the preset game has at least two game scenes; performing merging of the game scenes based on the game scene to be merged, directly obtaining a merged game scene if the number of player characters in the merged game scene is less than a threshold number for scene splitting, and performing splitting and merging of the game scenes based on the game scene to be merged if the number of player characters in the merged game scene is greater than the threshold number for scene splitting. This enables the game scene server to detect the number of player characters in the game scenes, so as to start merging of the game scenes to effectively avoid an embarrassing situation in which each game scene has fewer players after the merging. Moreover, the splitting and merging can also effectively reduce the pressure on a single scene, thereby solving the unreasonable problems existing in the prior game scene management strategy.

BRIEF DESCRIPTION OF DRAWINGS

The drawings illustrated herein are intended to provide a further understanding of the present disclosure and form part of the present disclosure, and the schematic embodiments of the present disclosure and description thereof are intended to explain the present disclosure and do not constitute an improper limitation of the present disclosure. In the accompanying drawings.

DETAILED DESCRIPTION OF EMBODIMENTS

Figure 1:
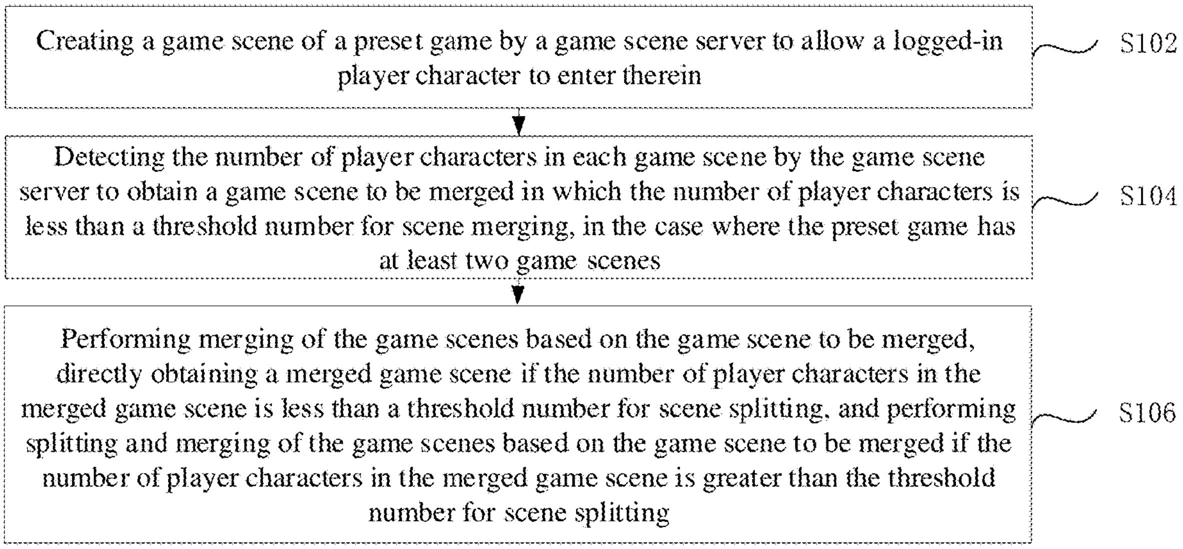
FIG. 1 is a step flowchart of a game scene management method according to an embodiment of the present disclosure.

In order to further clarify the objects, technical solutions, and advantages of the present disclosure, the present disclosure will be described and illustrated below with reference to the drawings and embodiments. It will be understood that the specific embodiments described herein are only intended to explain the present disclosure and are not intended to limit the present disclosure. All the other embodiments obtained by those of ordinary skill in the art in light of the embodiments provided in the present disclosure without inventive efforts will fall within the scope of the present disclosure as claimed.

Obviously, the drawings described below are only illustrative of some examples or embodiments of the present disclosure, and the present disclosure can be applied to other similar scenarios by those of ordinary skill in the art without inventive effort on the basis of these drawings. In addition, it can be understood that, although the efforts made in such development process may be complex and lengthy, some modifications in, for example, design, manufacturing, or production based on the technical contents disclosed in the present disclosure are merely conventional technical means for those of ordinary skill in the art related to the disclosure in the present disclosure, and the disclosure in the present disclosure should not be construed to be insufficient.

Reference to "an embodiment" in the present disclosure means that a particular feature, structure, or characteristic described in connection with the embodiment may be included in at least one embodiment of the present disclosure. The phase occurring in various places in the description neither necessarily refers to the same embodiment, nor refers to an independent or alternative embodiment mutually exclusive with other embodiments. It is explicitly and implicitly understood by those of ordinary skill in the art that the embodiments described in the present disclosure may be combined with other embodiments without conflict.

Unless otherwise defined, the technical or scientific terms referred to in the present disclosure shall have the general meanings understood by those of ordinary skill in the technical field to which the present disclosure relates. The word "one", "a", "an", "the", or the like referred to in the present disclosure does not indicate a quantitative limit and may mean singular or plural. The terms "including", "including", "having", and any variations thereof referred to in the present disclosure are intended to cover non-exclusive inclusion. For example, processes, methods, systems, products, or devices containing a series of steps or modules (units) are not limited to the steps or units listed, but may also include steps or units that are not listed, or may include other steps or units that are inherent to these processes, methods, products, or devices. The term "connection", "linking", "coupling", or the like referred to in the present disclosure is not limited to physical or mechanical connection, but may include electrical connection, either direct or indirect. The term "plurality" in the present disclosure means two or more. The term "and/or" describes an associated relationship between the associated objects and indicates that there may be three relationships. For example, "A and/or B" may indicate three cases, in which there is A alone, there are both A and B, and there is B alone. The character "/" generally indicates that the associated former and latter objects are related to each other by the term "or".

The terms "first", "second", "third", and the like referred to in the present disclosure are only intended to distinguish similar objects and do not represent a specific order of the referred objects.

An embodiment of the present disclosure provides a game scene management method. FIG. 1 is a step flowchart of a game scene management method according to an embodiment of the present disclosure. As shown in FIG. 1, the method includes the following steps.

In step S102, a game scene of a preset game is created by a game scene server to allow a logged-in player character to enter therein.

In step S102, specifically, a game scene is created by the game scene server as a target game scene of a preset game; a player character logged into the preset game is allowed to enter the target game scene, and if the number of player characters in the currently existing target game scene reaches a maximum threshold number for the scene, a game scene is continued to be created by the game scene server as a target game scene. Preferably, the preset game is a massive multiplayer online game.

As an illustration, while the game scene server is started, and a player is logged into the preset game to enter a game scene, if there is no game scene at that time, a new game scene A is created, and thereafter all newly logged-in players are allowed to enter the scene A. When the game scene A reaches a maximum threshold number for the scene, a new game scene B is created, and thereafter all newly logged-in players are allowed to enter the game scene B. In the same way, new game scenes are created successively. In the case where the preset game has two or more game scenes, the subsequent steps of the method are performed to balance the number of player characters across a plurality of game scenes.

After the step S102, the method further includes step S103 of evenly allocating player characters that are subsequently logged into the preset game by the game scene server so that the player characters enter a game scene with fewer player characters, if the number of player characters in the existing game scene does not reach a maximum threshold number for the scene due to the exit of player characters, in the case where the preset game has at least two game scenes.

It should be noted that, thereafter, the game scene server measures the numbers of players in the two scenes, and gives priority to entry into the scene with fewer players.

In step S104, in the case where the preset game has at least two game scenes, the number of player characters in each game scene is detected by the game scene server to obtain a game scene to be merged in which the number of player characters is less than a threshold number for scene merging.

As an illustration, in the case where the preset game has at least two game scenes, the game scene server will perform detection for scene merging every preset time period (e.g., 10 minutes). It will firstly rank all the game scenes in ascending order according to the number of player characters, perform detection from the game scene with the smallest number of player characters, and perform a merging operation if it is found that the number of player characters in a game scene is less than the threshold number for scene merging. At the same time, the game scene server will also detect the number of player characters in each game scene, and split a game scene if it is detected that the number of player characters in the game scene is greater than a threshold number for scene splitting.

In step S106, merging of the game scenes is performed based on the game scene to be merged, a merged game scene is directly obtained if the number of player characters in the merged game scene is less than a threshold number for scene splitting, and splitting and merging of the game scenes are performed based on the game scene to be merged if the number of player characters in the merged game scene is greater than the threshold number for scene splitting.

The step S106 specifically includes the following steps.

In step S1061, any of the game scenes to be merged is merged with another game scene, and different game scenes to be merged are merged, wherein another game scene is a game scene in which the number of player characters is greater than the threshold number for scene merging.

As an illustration, it is assumed that the threshold number for scene merging is 400 and the threshold number for scene splitting is 1000. During merging of game scenes, firstly all the game scenes are ranked in ascending order according to the number of player characters. If the number of player characters in each of game scene A, game scene B, and game scene C is 300, an attempt is made to firstly merge the game scene A into the game scene B, and the merging is successful if the number of players after being merged is less than 1000. Then an attempt is made to merge the game scene B into the game scene C, and the merging is successful if the number of players after being merged is less than 1000. As a result, both the game scene A and the game scene B are merged into the game scene C.

In step S1062, player characters in other game scene are split and merged into the game scene to be merged, so as to maintain a balance in the number of player characters between the other game scene and the game scene to be merged, wherein the other game scene is a game scene in which the number of player characters is greater than the threshold number for scene merging.

Preferably, in the splitting and merging in step S1062, it is detected whether there is character interaction between the player characters split from the other game scene (e.g., player characters teaming up with one another, or using/riding the same tool), and if yes, the player characters having character interaction with one another are split into the same split game scene.

As an illustration, it is assumed that the threshold number for scene merging is 400 and the threshold number for scene splitting is 1000. During merging of game scenes, firstly all the game scenes are ranked in ascending order according to the number of player characters. If game scene A, game scene B, game scene C, and game scene D have 350, 350, 390, and 800 player characters, respectively, they are ranked in the order of game scene A, game scene B, game scene C, and game scene D. An attempt is made to firstly merge the game scene A into the game scene B, and the merging is successful because the number of players after being merged is less than 1000, and then an attempt is made to merge the game scene B into the game scene C, and the merging of the game scene B is stopped because the number of players after being merged will be greater than 1000.

Then an attempt is made to merge the game scene C into the game scene D. Because the number of players will be greater than 1000 after the game scene C is merged into the game scene D, a splitting rule is executed such that some players in the game scene D are merged into the game scene C and such that the number of players in the game scene C is balanced with that in the game scene D. As a result, the game scene A is merged into the game scene B, and some players in the game scene D are merged into the game scene C, wherein when it is necessary to split some players from the game scene D into the game scene C, if it is found, during movement of player A, that player A is riding the same mount with player B in the same game scene, or it is found that player A is teamed up with player C in the same game scene, namely, there is character interaction therebetween, then player A is merged into the game scene C along with player B and player C.

The above steps in the embodiment of the present disclosure enable the game scene server to detect the number of player characters in the game scenes, so as to start merging of the game scenes to effectively avoid an embarrassing situation in which each game scene has fewer players after the merging. Moreover, the splitting and merging can also effectively reduce the pressure on a single scene, thereby solving the unreasonable problems existing in the prior game scene management strategy.

It should be noted that the steps shown in the above process or in the flowchart of the accompanying drawings may be executed in a computer system such as a set of computer-executable instructions, and although the logical order is shown in the flowchart, in some cases, the steps shown or described may be executed in a different order from here.

Figure 2:
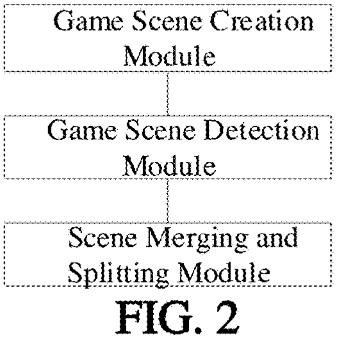
FIG. 2 is a structural block diagram of a game scene management system according to an embodiment of the present disclosure.

An embodiment of the present disclosure provides a game scene management system. FIG. 2 is a structural block diagram of a game scene management system according to an embodiment of the present disclosure. As shown in FIG. 2, the system includes a game scene creation module, a game scene detection module, and a scene merging and splitting module.

The game scene creation module is configured to create a game scene of a preset game by a game scene server to allow a logged-in player character to enter therein.

The game scene detection module is configured to detect the number of player characters in each game scene by the game scene server to obtain a game scene to be merged in which the number of player characters is less than a threshold number for scene merging, in the case where the preset game has at least two game scenes.

The scene merging and splitting module is configured to perform merging of the game scenes based on the game scene to be merged, directly obtain a merged game scene if the number of player characters in the merged game scene is less than a threshold number for scene splitting, and perform splitting and merging of the game scenes based on the game scene to be merged if the number of player characters in the merged game scene is greater than the threshold number for scene splitting.

The game scene creation module, the game scene detection module, and the scene merging and splitting module in the embodiment of the present disclosure enable the game scene server to detect the number of player characters in the game scenes, so as to start merging of the game scenes to effectively avoid an embarrassing situation in which each game scene has fewer players after the merging. Moreover, the splitting and merging can also effectively reduce the pressure on a single scene, thereby solving the unreasonable problems existing in the prior game scene management strategy.

It should be noted that the above individual modules may be functional modules or program modules, which may be implemented by software or implemented by hardware. For modules implemented by hardware, the above individual modules may be located in the same processor. Alternatively, the above individual modules may be located in different processors in any combined form, respectively.

The present embodiment further provides an electronic apparatus including a memory and a processor, wherein a computer program is stored in the memory, and the processor is configured to run the computer program to execute the steps in any of the above method embodiments.

Optionally, the above electronic apparatus may further include a transmission device and an input and output device, wherein the transmission device is connected to the above processor, and the input and output device is connected to the above processor.

It should be noted that specific examples in the present embodiment may be understood with reference to the examples described in the above embodiments and optional embodiments, and thus the present embodiment is not described in detail herein.

In addition, an embodiment of the present disclosure may provide a storage medium to be implemented in combination with the game scene management method in the above embodiment. A computer program is stored on the storage medium, and any one of the game scene management methods in the above embodiments is implemented when the computer program is executed by a processor.

In one embodiment, a computer device is provided, which may be a terminal. The computer device includes a processor, a memory, a network interface, a display screen, and an input apparatus connected via a system bus. Here, the processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through network connection. The computer program is executed by the processor to implement a game scene management method. The display screen of the computer device may be a liquid crystal display screen or an electronic ink display screen, and the input apparatus of the computer device may be a touch layer covering the display screen, or may be a key, trackball, or trackpad disposed on the housing of the computer device, or may be an external keyboard, trackpad, or mouse or the like.

Figure 3:
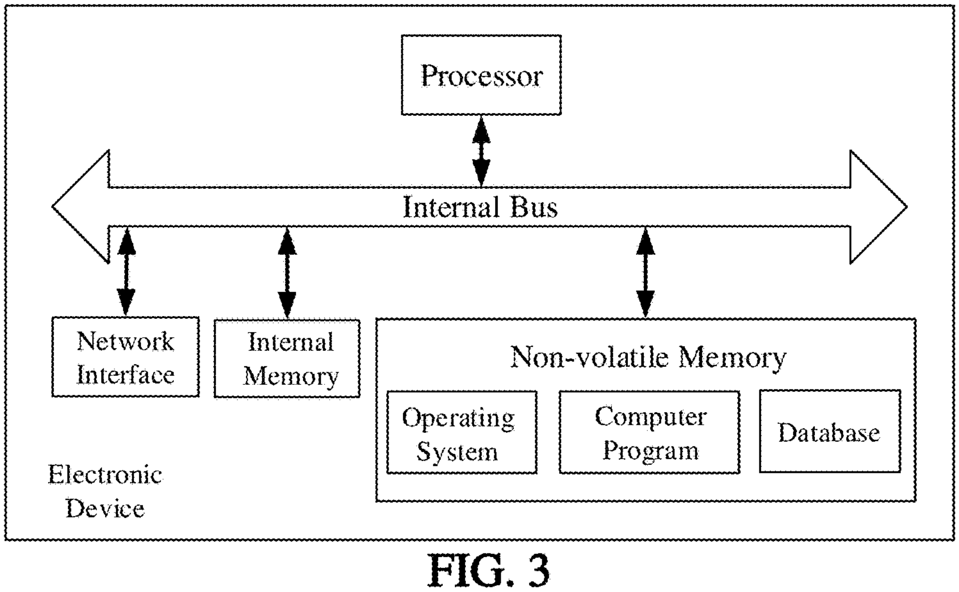
FIG. 3 is a schematic diagram of the internal structure of an electronic device according to an embodiment of the present disclosure.

In one embodiment, FIG. 3 is a schematic diagram of the internal structure of an electronic device according to an embodiment of the present disclosure. As shown in FIG. 3, an electronic device is provided, the electronic device may be a server, and its internal structural diagram may be shown in FIG. 3. The electronic device includes a processor, a network interface, an internal memory, and a non-volatile memory connected via an internal bus, wherein the non-volatile memory stores an operating system, a computer program, and a database. The processor is configured to provide computing and control capabilities, the network interface is configured to communicate with an external terminal through network connection, the internal memory is configured to provide an environment for running of the operating system and the computer program, the computer program is executed by the processor to implement a game scene management method, and the database is configured to store data.

It can be understood by those skilled in the art that the structure shown in FIG. 3 is only a block diagram of the partial structure related to the solution of the present disclosure and does not constitute a limitation of an electronic device to which the solution of the present disclosure is applied. A specific electronic device may include more or fewer components than those shown, or have some combined components, or have a different component arrangement.

It can be understood by those of ordinary skill in the art that the processes in the methods of the above embodiments may be wholly or partially implemented by instructing relevant hardware through a computer program, the computer program may be stored in a non-volatile computer-readable storage medium, and the computer program may include a process such as the embodiment of each of the above methods when executed. Here, any reference to memory, storage, database, or other medium as used in each embodiment provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM) or an external cache memory. Illustratively but non-restrictively, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), a Rambus dynamic RAM (RDRAM), and the like.

It will be appreciated by those skilled in the art that the individual technical features of the embodiments described above may be arbitrarily combined, and although not all possible combinations of the individual technical features in the above embodiments have been described for the sake of brevity, the combinations of these technical features shall be deemed to fall within the scope of this specification as disclosed, as long as there is no contradiction between the combinations of these technical features.

The embodiments described above are merely representative of several embodiments of the present disclosure, and should not be construed as limiting the scope of the patent for invention although they are described in a specific and detailed way. It should be noted that a number of variations and improvements can be made by those of ordinary skill in the art without departing from the concept of the present disclosure and shall fall within the scope of protection of the present disclosure. Therefore, the scope of protection of the present patent application should be defined by the attached claims.

What is claimed is:

1. A game scene management method, the method comprising steps of:

creating a game scene of a preset game by a game scene server to allow a logged-in player character to enter therein;

detecting the number of player characters in each game scene by the game scene server to obtain a to-be-merged game scene in which the number of player characters is less than a threshold number for scene merging, in the case where the preset game has at least two game scenes;

performing merging of the game scenes based on the to-be-merged game scene, directly obtaining a merged game scene if the number of player characters in the merged game scene is less than a threshold number for scene splitting, and splitting player characters in another game scene and merging them into the to-be-merged game scene if the number of player characters in the merged game scene is greater than the threshold number for scene splitting, so as to maintain a balance in the number of player characters between another game scene and the to-be-merged game scene, wherein another game scene is a game scene in which the number of player characters is greater than the threshold number for scene merging; and detecting whether there is a character interaction between player characters split from another game scene during splitting and merging, and if there is a character interaction between player characters split from another game during splitting and merging, splitting player characters having character interaction with each other into the same split game scene.

2. The method according to claim 1, wherein the step of creating a game scene of a preset game by a game scene server to allow a logged-in player character to enter therein comprises:

creating the game scene by the game scene server as a target game scene of the preset game; and allowing a player character logged into the preset game to enter the target game scene, and continuing to create a game scene by the game scene server as the target game scene if the number of player characters in the currently existing target game scene reaches a maximum threshold number for the scene.

3. The method according to claim 1, wherein after the step of creating a game scene of a preset game by a game scene server to allow a logged-in player character to enter therein, the method comprises:

evenly allocating, by the game scene server, player characters that are subsequently logged into the preset game so that they enter a game scene with fewer player characters, if the number of player characters in the existing game scene does not reach a maximum threshold number for the scene due to exit of player characters, in the case where the preset game has at least two game scenes.

4. The method according to claim 1, wherein the step of performing merging of the game scenes based on the to-be-merged game scene comprises:

merging any of the to-be-merged game scenes with another game scene, and merging the different to-be-merged game scenes, wherein another game scene is a game scene in which the number of player characters is greater than the threshold number for scene merging.

5. The method according to claim 1, further comprising a step of:

detecting the number of player characters in each game scene by the game scene server, and splitting a game scene if it is detected that the number of player characters therein is greater than the threshold number for scene splitting.

6. The method according to claim 1, wherein the preset game is a massive multiplayer online game.

7. An electronic apparatus, comprising a memory and a processor, wherein the memory stores a computer program, and the processor is configured to run the computer program to execute the method according to claim 1.

8. A non-transitory computer-readable storage medium, storing a computer program thereon, wherein the computer program, when executed by a processor, implements the method according to claim 1.

* * * * *